United States Patent [19]
Inoue et al.

[11] Patent Number: 5,355,707
[45] Date of Patent: Oct. 18, 1994

[54] ROLLING MILL AND METHOD FOR OPERATING ROLLING MILL

[75] Inventors: Tetsuo Inoue; Tohru Yoshioka; Hideaki Yoshimatsu; Akira Nohara, all of Kobe, Japan

[73] Assignee: Kabushiki Kaisha Kobe Seiko Sho, Kobe, Japan

[21] Appl. No.: 929,832

[22] Filed: Aug. 14, 1992

[30] Foreign Application Priority Data

Aug. 14, 1991 [JP] Japan .................. 3-204412
Dec. 26, 1991 [JP] Japan .................. 3-345595
Apr. 23, 1992 [JP] Japan .................. 4-104825

[51] Int. Cl.$^5$ ............ B21B 31/20; F15B 15/22
[52] U.S. Cl. .................. 72/245; 72/248; 92/27
[58] Field of Search ......... 72/16, 20, 241.2, 241.8, 72/242.2, 242.4, 238, 245, 244, 248; 92/23, 24, 27, 52

[56] References Cited

U.S. PATENT DOCUMENTS

| | | | |
|---|---|---|---|
| 2,034,939 | 3/1936 | Biggert, Jr. ............ | 72/248 |
| 2,582,030 | 1/1952 | Halward ............... | 92/27 |
| 3,628,363 | 12/1971 | Diolot ................ | 72/245 |
| 3,858,424 | 1/1975 | Kajiwara et al. ....... | 72/242.4 |
| 3,938,362 | 2/1976 | Falk et al. . | |
| 4,619,188 | 10/1986 | Kimura ............... | 92/27 |
| 5,142,896 | 9/1992 | Berger et al. ......... | 72/242.4 |

FOREIGN PATENT DOCUMENTS

| | | |
|---|---|---|
| 0429812 | 6/1991 | European Pat. Off. . |
| 1939181 | 2/1971 | Fed. Rep. of Germany ..... 72/242.4 |
| 2406326 | 11/1974 | Fed. Rep. of Germany . |
| 3810389 | 10/1989 | Fed. Rep. of Germany ........ 92/27 |
| 3913837 | 10/1990 | Fed. Rep. of Germany . |
| 3939124 | 5/1991 | Fed. Rep. of Germany . |
| 56-1207 | 1/1981 | Japan . |
| 56-1208 | 1/1981 | Japan . |
| 58-85401 | 6/1983 | Japan . |
| 58-85404 | 6/1983 | Japan . |
| 60-131206 | 9/1985 | Japan . |
| 62-41403 | 3/1987 | Japan . |
| 3169406 | 7/1991 | Japan . |
| 1585036 | 8/1990 | U.S.S.R. ............................ 72/245 |

*Primary Examiner*—Lowell A. Larson
*Assistant Examiner*—Thomas C. Schoeffler
*Attorney, Agent, or Firm*—Oblon, Spivak, McClelland, Maier & Neustadt

[57] ABSTRACT

A rolling mill in which an upper housing is guided upward and downward along columns, a fluid chamber is formed between the upper end section of each column and a column insertion hole of the upper housing; a fixed piston fixedly mounted on the column is fitted in the fluid chamber; a roll gap rapid widening piston is fixedly installed on the upper end of the column, and on this piston is vertically movably fitted a hydraulic cylinder; the hydraulic cylinder is fixedly mounted in the upper housing; pressure fluid is constantly supplied to an upper fluid chamber on the piston; a fluid chamber is provided in the column insertion hole of the upper housing, and a column clamping sleeve is fitted therein; and the pressure fluid is fed into, and discharged out of, the fluid chamber to move the upper housing upward and downward.

11 Claims, 8 Drawing Sheets

ROLLING MILL AND METHOD FOR OPERATING ROLLING MILL

BACKGROUND OF THE INVENTION

1. Field of the Invention

The present invention relates to a rolling mill with an upper housing which is vertically movable through a column in relation to a lower housing, and a method of operating the rolling mill.

2. Description of the Prior Art

As a conventional reduction device of a rolling mill, a SCREW-type reduction device (a conventional example 1) shown in FIG. 8 and a hydraulic reduction device (a conventional example 2) disclosed in Japanese Patent Laid-open No. Hei 3-169406 (European Patent No. 0 429 812 A2).

In FIG. 8, a lower housing 31 holding lower rolls 33 is securely set on a base 32, and an upper housing 36 holding upper rolls 37 is vertically movably mounted on four columns 34 which are installed upright through nuts 35 at four corners of the lower housing 31. Each of the columns 34 is decreased in diameter at the top end, which is provided with a threaded portion 38. The threaded portion 38 is installed in a threaded hole 40 of a worm wheel 39 which is rotatably but vertically unmovably fitted in the upper housing 36. A worm 41 in mesh with each worm wheel 39 is synchronously rotated by a driving gear and a transmission gear (not illustrated), thereby moving the upper housing 36 up and down to preset a roll gap and to widen the roll gap at the time of roll replacement.

The conventional example 1 stated above, however, has the following drawback that the upper rolls can not be raised rapidly when the rapid widening of the roll gap is required at the time of strip or roll replacement because the elevating speed of the upper housing is 60 mm/min., with the result that a fire will arise in case of a plate fracture or a fractured material will stay in a roll tool section, and also that the housing will take considerable time when lowering to preset the roll gap, presenting a problem in operation efficiency.

On the other hand, in the conventional example 2, the upper housing elevating means is a hydraulic elevating means; therefore, the rolling mill of the example 2, capable of, for example, rapid widening of the roll gap, is much more advantageous than the conventional example 1.

However, the conventional example 2 has the problem that since the reduction force of the rolls is hydraulically adjusted, plate thickness control accuracy will become deteriorated due to fluid compressibility.

SUMMARY OF THE INVENTION

It is a first object of the present invention to provide a rolling mill in which a housing is fixedly secured to the column which is locked with frictional lock means, so that the fluid compressibility which has an effect on the plate thickness control accuracy is restrained as much as possible, thereby preventing the lowering of a mill constant in the case of elastic deformation of fluid during rolling.

It is a second object of the present invention to provide a rolling mill which is capable of rapid presetting and widening a roll gap and simple and high-accuracy housing position control.

Further it is a third object of the present invention to provide a method of operating the rolling mill which is capable of plate thickness control for controlling the plate thickness of materials to be rolled, the widening and presetting of the roll gap, and the efficient change of rolls.

As one preferred embodiment of the present invention, there is a rolling mill which comprises lower rolls, a lower housing for holding these lower rolls, upper rolls, an upper housing for holding these upper rolls, four columns for connecting the upper and lower housings, and frictional lock means fitted on the outside of the column and fixed in at least one of the upper and lower housings. This frictional lock means is used to fixedly install either housing to the column by pressing the column.

Furthermore, the preferred embodiment will be improved by using a plate thickness control means for controlling the plate thickness of materials to be rolled, by hydraulically adjusting the reduction force, and a hydraulic elevating means for adjusting the roll gap.

According to the present invention, since the elasticity (compressibility) of the fluid for plate thickness control is restrained by the frictional lock means, it is possible to absorb a reaction force caused by rolling, thence enabling high-accuracy control of housing position. Furthermore, using a combination of the hydraulic elevating means and the frictional lock means can rapidly release the housing and hold the housing in the released state. Accordingly it is possible to perform roll replacement in a short time and with safety, and also to move the housing downwardly and hold the housing in the lowered state, thus insuring safe and short-time roll gap presetting operation. Furthermore, it is possible to prevent a fire in the event of rupture of a material under rolling and to insure easy recovering work.

Also as one preferred embodiment of the present invention is provided the method of operating the rolling mill which comprises the lower housing for holding the lower rolls, the upper housing for holding the upper rolls, the column for connecting both the housings with each other, the plate thickness control means for controlling the plate thickness of the material to be rolled, the hydraulic elevating means for adjusting the roll gap, and the frictional lock means including an elastically deformable sleeve for releasing and fixing the upper housing in relation to the column. This method comprises the plate thickness control step for controlling the plate thickness of materials to be rolled, and the rapid roll-gap widening step for releasing the frictional lock means and for rapidly raising the upper housing from the lower housing by operating the hydraulic elevating means.

Furthermore, the preferred embodiment can be further improved by adding a step for changing the rolls after the rapid roll-gap widening step or by adding the roll gap preset step for fixing the housing on the column before the plate thickness control step.

According to the present invention, the provision of the friction lock means and the hydraulic elevating means can rapidly widen the roll gap and complete roll replacement within a short period of time. Also, it is possible to easily preset the roll gap within a short period of time.

The above and other objects, features and advantages of the present invention will become more apparent and the invention itself will best be understood from a study of the following description and appended claims with reference to the accompanying drawings showing some preferred embodiments of the invention.

DESCRIPTION OF THE PREFERRED EMBODIMENT

Hereinafter preferred embodiments of a rolling mill and a method of operating the rolling mill according to the present invention will be described with reference to the accompanying drawings.

Figure 1:
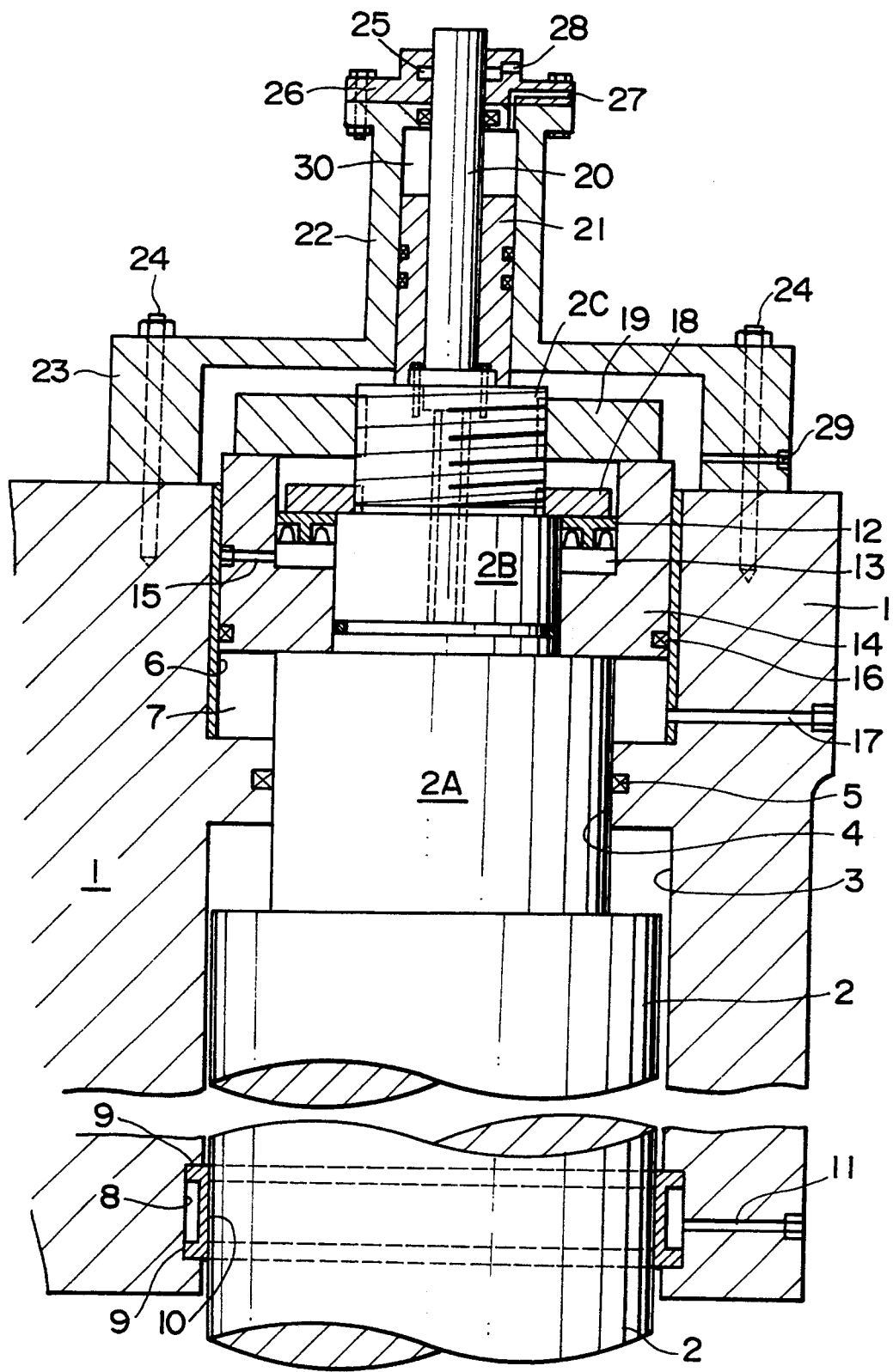
FIG. 1 is a longitudinal sectional view showing a major portion of a first embodiment of the present invention.

FIG. 1 shows a first embodiment of the present invention. Since the constitution of other parts of the rolling mill is the same as conventional examples, no detailed description is given, but only a part embodying the present invention will be described in detail.

In FIG. 1, a numeral 1 denotes an upper housing and a numeral 2 refers to a column. In the upper part of a column insertion hole 3 formed in four corners of the upper housing 1 is formed a contracted hole section 4, which is slidably fitted on the outside of the lowermost-stage contracted section 2A formed in three stages on the top end of the column 2. In the contracted hole section 4 is fitted a seal ring 5, and in the upper part of the contracted hole section 4 is installed a bushing 6 to form a fluid chamber 7.

In the lower part of the column insertion hole 3 of the upper housing 1 is formed a fluid chamber 8 for clamping the column. In this fluid chamber 8 is fitted a column pressing sleeve 10 having outwardly extended collars 9 on the outer periphery at upper and lower opening ends. A pressure is applied in the direction of reduction of diameter of the sleeve 10 by supplying the hydraulic fluid to the outer periphery of the sleeve 10 on the fluid chamber 8 through the fluid passage 11, thereby fixing the sleeve 10 to the column 2. The sleeve 10 is released from the column 2 by discharging the hydraulic fluid.

That is, the sleeve 10 fitted in the fluid chamber 8, being not movable in the axial direction but being elastically deformable in the radial direction, is elastically deformed by applying the hydraulic fluid as a pressure medium to the outer periphery of the sleeve 10 and by maintaining the hydraulic fluid, thus locking the column 2 with friction. The column 2 will be released by removing the hydraulic fluid. The sleeve 10 constitutes the frictional lock means 10, which is mounted on each of the four columns 2.

On the outside surface of the middle-stage contracted section 2B formed at the upper end section of the column 2 is installed a fixed piston 14 having a preload cylinder fluid chamber 13 with a piston 12 inserted therein. On the outside surface of this fixed piston 14 is vertically slidably mounted the bushing 6. In the fluid chamber 13 is provided a hydraulic fluid discharge passage 15. A seal ring 16 is installed in the outside surface of the lower part of the fixed piston 14. A numeral 17 is a hydraulic fluid supply-discharge passage for supplying the hydraulic fluid to, and discharging from, the fluid chamber 7. The plate thickness control means 7 and 14 are mounted, coaxially with the frictional lock means 10, on each of the four columns.

The column 2 is provided with a threaded portion 2C formed in the uppermost-stage contracted section, on which a preload nut 18 and a fixing nut 19 for fixing the fixed piston 14 are screwed. Since the nut 19 is of a large diameter, the hydraulic fluid is fed in underside of the piston 12 in the fluid chamber 13 with the preload nut 18 in a screwed state when the fixing nut 19 is tightened, and with the fixed piston 14 preloaded, the fixing nut 19 is tightened.

On the top end of the column 2 a piston rod 20 is fixedly installed coaxially with the column 2. A piston 21 is fixedly mounted on the outside surface of the lower portion of the rod 20. A hydraulic cylinder 22 for rapidly widening the roll gap is coaxially mounted through the piston rod 20. The lower part of this hydraulic cylinder 22 is expanded in diameter to form a leg section 23, which is fixedly installed by tie rods 24 on the upper surface of the upper housing 1, thus forming the hydraulic cylinder 22 and the upper housing 1 in one body.

On the top end of the hydraulic cylinder 22 is fixedly installed a cover 26 having a drain fluid recovery chamber 25. The drain fluid recovery chamber 25 is provided with a hydraulic fluid supply passage 27 for supplying the fluid to a fluid chamber 30 located on the piston 21 and a drain fluid recovery hole 28. The hydraulic cylinder 22 has a drain fluid recovery hole 29 also in the leg section 23.

Here, the hydraulic piston 21, the hydraulic cylinder 22, etc. are hydraulic elevating means for rapidly widening the roll gap of the upper housing 1 mounted on each of the four columns 4, coaxially with the lock means 10.

Next, the mode of operation of the embodiment shown in FIG. 1 will be explained. The hydraulic fluid is constantly supplied as a balance pressure oil into the fluid chamber 30 located above the hydraulic cylinder 22 for rapidly widening the roll gap. FIG. 1 shows a preset state of the roll gap with the upper housing 1 lowered after filling the fluid chamber 30 with the hydraulic fluid. In this state, the hydraulic fluid is filled in the outer periphery of the lock means 10 for pressing the column, which will be clamped to hold the roll gap in the preset state.

That is to say, the plate thickness control is hydraulically effected; this plate thickness control is effected by adjusting the lower position of the upper housing 1 by supplying the hydraulic fluid to the fluid chamber 7 with the lock means 10 released. During rolling, the column 2 is pressed by the lock means 10 to hold the upper housing 1 in the position with a frictional force, thereby controlling the compressibility of the hydraulic pressure as much as possible.

When the roll gap is rapidly widened to perform roll replacement, first the hydraulic fluid is discharged from the outer periphery of the lock means 10 for pressing the column, allowing the sleeve to recover its original state with the elastic restoration force of itself in order to release clamping of the column. At the same time, as the hydraulic fluid is discharged out of the fluid chamber 7 of the upper housing 1, the hydraulic fluid is filled at a rapid rate into the fluid chamber 30 in the upper part of the hydraulic cylinder 22, the upper housing 1 together with the hydraulic cylinder 22 moving upward fast to widen the roll gap within a few seconds.

When the roll gap has thus been widened, the hydraulic fluid is filled into the outer periphery of the lock means 10 for pressing the column, elastically contracting the sleeve with the hydraulic pressure to thereby clamp the column 2 with the frictional force and accordingly holding the roll gap in a widened state. Thence the upper housing 1 is prevented from lowering, enabling rapid and safe replacement of the rolls during this period.

When the roll replacement has been completed, the hydraulic fluid is discharged out from the outer periphery of the lock means 10 for pressing the column to unclamp the column. Then when the fluid chamber 7 of the upper housing 1 has been filled with the hydraulic fluid, the upper housing 1 moves downward at a high rate, completing the presetting of the roll gap. Then, the hydraulic fluid is filled in the outer periphery of the lock means 10 for pressing the column and the upper housing 1 is fixed to the column 2, thus checking the upward and downward movement of the upper housing 1 to hold the roll gap.

Figure 2:
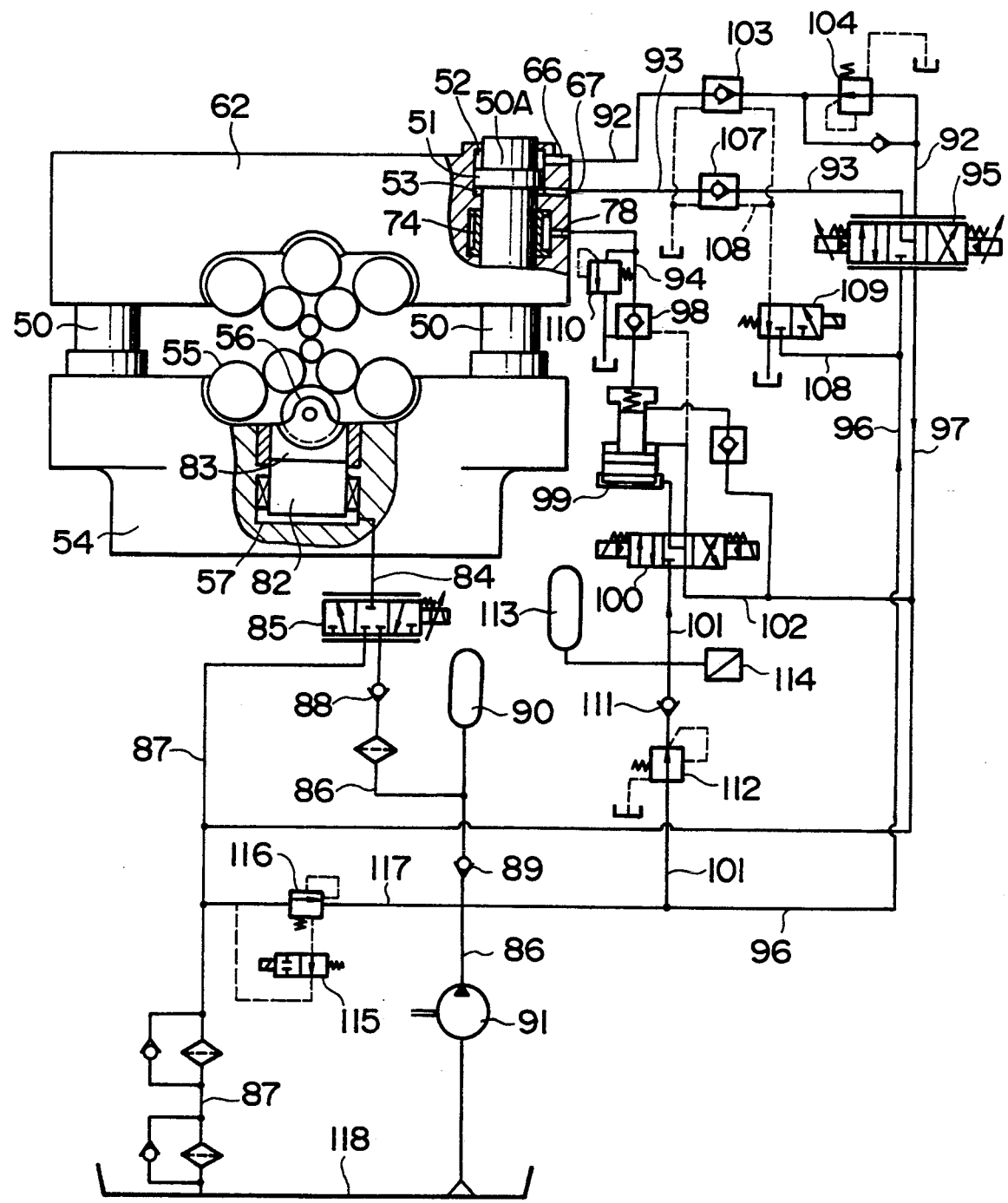
FIG. 2 is a partly broken front view and a hydraulic circuit diagram showing a second embodiment of the present invention.
Figure 3:
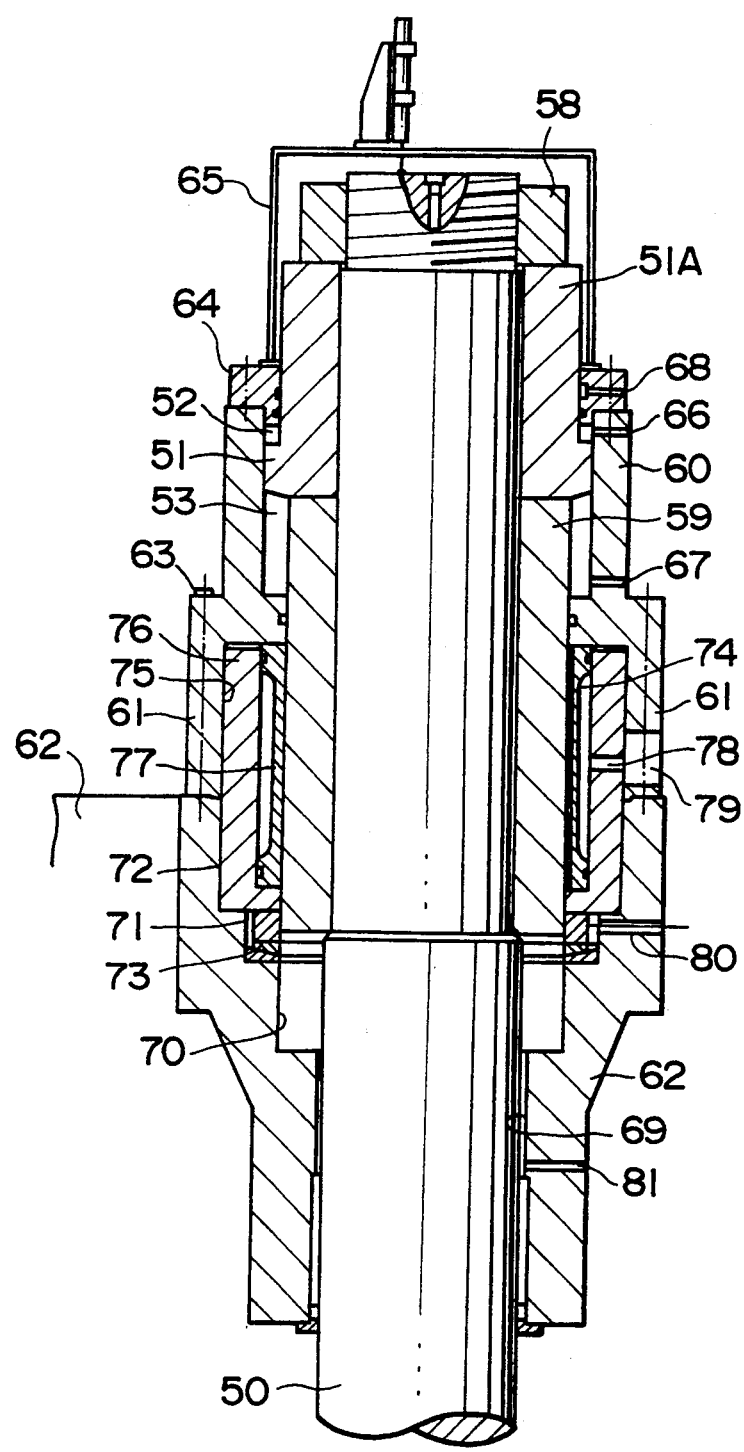
FIG. 3 is an enlarged longitudinal sectional view showing a major portion of the second embodiment.

FIGS. 2 and 3 show a second embodiment of the present invention. The second embodiment differs from the above-described first embodiment in two points that fluid chambers 52 and 53 are provided on and under a fixed piston 51 mounted mainly on the upper end section 50A of each column 50, for purpose of rapidly widening the roll gap with a balancing pressure fluid constantly supplied to the fluid chamber 52 located on the fixed piston 51, and that a large-diameter plate thickness control hydraulic cylinder 57 is provided below lower rolls 55, particularly a central backup roll 56, in the lower housing 54.

In FIG. 2 the lower rolls 55 include one work roll, two intermediate rolls and three backup rolls, all of which are supported in the lower housing 54. The upper rolls supported in the upper housing 62 are arranged symmetrically in relation to the lower rolls, on both the upper and lower sides of the center of a pass line.

In the second embodiment, as shown in FIG. 3, the piston 51 is fixedly installed by a nut 58 on the upper end section 50A of each column; a sleeve 59 is fixed adjacently under the piston 51; on the outside surface of the sleeve 59 and the fixed piston 51 is coaxially and vertically movably mounted a hydraulic cylinder 60 for rapid widening of the roll gap; the lower part of the hydraulic cylinder 60 is expanded in diameter to serve as a leg section 61; and the lower end of this leg section is fixedly attached by a tie rod 63 to the upper surface of the upper housing 62. The hydraulic cylinder 60 and the upper housing are formed in one body.

On the upper end of the hydraulic cylinder 60 is securely installed a cylinder cover 64 which passes through a rod section 51A of the fixed piston 51. On this cylinder cover 64 a cylindrical piston cover 65 having a lid is fixedly attached. In the upper and lower parts of the side wall of the hydraulic cylinder 60 are provided a balancing pressure fluid supply passage 66 and an auxiliary pressure fluid supply passage 67 communicating with the fluid chambers 52 and 53. In a cylinder cover 64 is formed a drain fluid recovery hole 68.

On the upper part of a column insertion hole 69 formed at four corners of the upper housing 62 are formed expanded sections in three stages 70, 71 and 72 expanding as they go upward. On the lower-stage expanded section 70 the sleeve 59 is vertically slidably installed; and on the middle-stage expanded section 71 a load cell 73 is installed. The upper-stage expanded section 72 has the same inside diameter as the hydraulic cylinder leg section 61; these two sections are connected with each other, serving as a pressure-resisting cylinder chamber 75 which forms a fluid chamber 74 for clamping. In this cylinder chamber 75 are fitted a pressure-resisting cylinder 76 and a sleeve 77 for pressing the column.

In the peripheral wall of the pressure-resisting cylinder 76 is provided a clamping pressure fluid supply-discharge passage 78; and a fluid pipe communicating hole 79 communicating with this supply-discharge passage 78 is provided in the hydraulic cylinder leg section 62. In FIG. 3, a numeral 80 is a load cell cable outlet and a numeral 81 denotes a drain fluid recovery hole.

Figure 4:
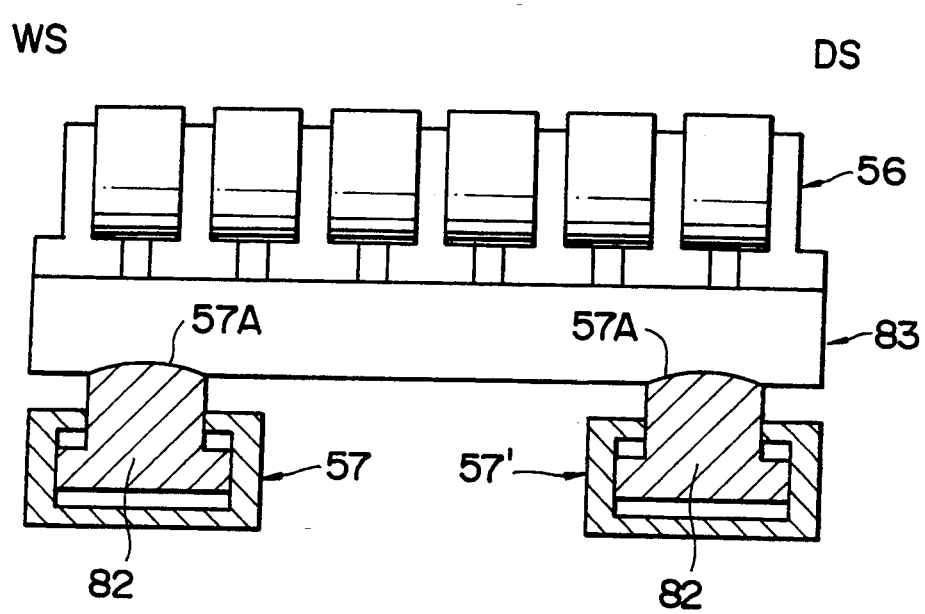
FIG. 4 is a sectional view of a plate thickness control means of FIG. 2.

As shown in FIG. 2, two hydraulic cylinders 57 for plate thickness control disposed on both sides in the longitudinal direction of rolls have a larger inner diameter than the fluid chambers 52 and 53 for rapid widening of the roll gap, and a pedestal 83 of the central backup roll 56 is supported, by a piston 82 installed in the cylinder 57, via a spherical surface section 57A shown in FIG. 4, to apply a reduction force. The spherical surface section 57A follows immediately at the time of skew reduction. Connected to the hydraulic cylinder 57 is a hydraulic fluid supply-discharge pipe 84 which controls the plate thickness; to this fluid supply-discharge pipe 84 are connected a fluid supply pipe 86 and a fluid discharge pipe 87 through a servo valve 85; and on the way of the fluid supply pipe 86 are connected check valves 88 and 89, an accumulator 90 and an oil pump 91.

Fluid supply pipes 92 and 93 and fluid supply-discharge pipe 94 are connected to the pressure fluid supply passages 66 and 67 and the clamping pressure fluid supply-discharge passage 78 as shown in FIG. 2. Both of these fluid supply pipes 92 and 93 are connected to a pressure fluid supply branch pipe 96 and a fluid discharge branch pipe 97 through an electromagnetic proportional changeover valve 95. The fluid supply-discharge pipe 94 is connected to an electromagnetic hydraulic changeover valve 100 through a pilot check valve 98 and a booster 99; to the electromagnetic hydraulic changeover valve 100 are connected a hydraulic fluid supply pipe 101 and a fluid discharge branch pipe 102.

In the fluid supply pipe 92 are installed a pilot check valve 103 and a pressure-reducing valve 104; to the fluid supply pipe 93 is a pilot check valve 107; and the external pilot fluid pipe 108 of the pilot check valves 103 and 107 is connected to the pressure fluid supply branch pipe 96 via the electromagnetic valve 109.

Between the pilot check valve 98 of the hydraulic fluid supply-discharge pipe 94 and the fluid supply-discharge passage 78 is connected a direct-acting, leakage-free thermal relief valve 110 (a set pressure is greater than that of a pressure-reducing valve 112) for preventing an excessive pressure resulting from the rise of fluid temperature. To the clamping hydraulic fluid supply pipe 101 are connected a check valve 111, a pressure-reducing valve 112, an accumulator 113 for replenishing fluid leakage of the booster 99 system, a pressure sensor 114 (check and warning of a pressure source for the accumulator 113 and the booster 99). The fluid supply pipe 86 and the fluid discharge pipe 87 are connected to a bypass pipe 117 through an unloading relief valve 116. A numeral 118 refers to a fluid tank.

Next, the mode of operation of the second embodiment of the rolling mill will be explained.

The electromagnetic proportional changeover valve 95 is operated so as to constantly supply the pressure fluid as a balancing pressure oil into the fluid chamber 52 located above the hydraulic cylinder 60 for rapidly widening the roll gap. When the upper housing 62 is to be lowered at a high rate, the pilot check valve 103 is opened by the electromagnetic valve 109, changing the electromagnetic proportional changeover valve 95 to supply the pressure fluid into the fluid chamber 53 under the hydraulic cylinder 60, and stopping the upper housing 62 at the set position (which is detected by a sensor). Subsequently, the electromagnetic changeover valve 100 is operated to supply the hydraulic fluid to the clamping fluid chamber 74 to elastically deform the sleeve 77, thereby pressing the column 50 through the distance sleeve 59 for purpose of locking the upper housing 62 to the column 50. The upper housing 62, therefore, is checked from moving upward and downward to hold the specific roll gap.

On the other hand, with the locking means 77 released to an unlock state, the pressure fluid is supplied into the hydraulic cylinder 57 to support the central backup roll 56 of the lower rolls 55, thus presetting the roll gap. In this state, the roll gap control, or plate thickness control, is effected by the servo valve 85 in accordance with the material to be rolled.

In this plate thickness control, a pair of hydraulic cylinders 57 shown in FIG. 4 are hydraulically operated by the same amount for simultaneous reduction, and unevenly, that is, by a different amount, for skew reduction. The tilt of the hydraulic cylinders is absorbed for correcting purpose by the spherical surface section 57A.

After the adjustment of the reduction pressure by the plate thickness control means 57 in accordance with the material to be rolled, the lock means 77 is operated to lock the column. During this rolling operation, the rolling reaction acting on the upper housing 62 is transmitted from the sleeve 77 for locking the column to the column 50 through the sleeve 59, by utilizing the frictional force resulting from the locking of the column 50. Furthermore, although the instantaneous supply of a large flow rate of pressure fluid is required for plate thickness control, this requirement can be satisfied at a high rate by the accumulator 90 in the fluid supply pipe 86; therefore it is unnecessary to increase the pump capacity.

In the meantime, when rapidly widening the roll gap for the purpose of roll replacement, first the pressure fluid is discharged out of the fluid chamber 74 in the outer periphery of the sleeve 77 which is a lock means for locking the column, to thereby release clamping of the column, and then the electromagnetic valve 109 is changed over to open the pilot check valve 107. When the electromagnetic proportional changeover valve 95 is switched, the pressure fluid is filled at a high rate into the upper fluid chamber 52; accordingly the upper housing 62 rapidly rises together with the hydraulic cylinder 60, thus widening the roll gap within a short period of time.

When the roll gap is widened, the hydraulic fluid is filled in the fluid chamber 74 and the column 50 is clamped by The lock means to hold the roll gap in the widened state, thereby preventing the lowering of the upper housing 62 so that roll replacement can be performed with safety during this period. After the completion of the roll replacement, the hydraulic fluid is discharged out of the fluid chamber to release clamping of the column. Then, the pressure fluid is filled in the lower fluid chamber 53 to thereby lower the upper housing 62 rapidly to finish the presetting of the roll gap.

In the second embodiment, the pressure-reducing valve 104 is installed on the way of the balancing pressure fluid supply pipe 92. This pressure-reducing valve 104 has been preset a little higher than the pressure corresponding to the self-weight of the upper housing, and therefore the hydraulic cylinder 60 outputs a force comprising the self-weight of the upper housing 62 plus alpha during rolling, thereby moving the upper housing 62 by the amount of lock by the locking function of the sleeve 77 for locking the column and a play of the upper housing 62 and accordingly compensating for the play.

Also, it is possible to use a servo valve in place of the electromagnetic proportional changeover valve 95 and the electromagnetic changeover valve 100 in the second embodiment for purpose of improving positional accuracy.

Figure 5:
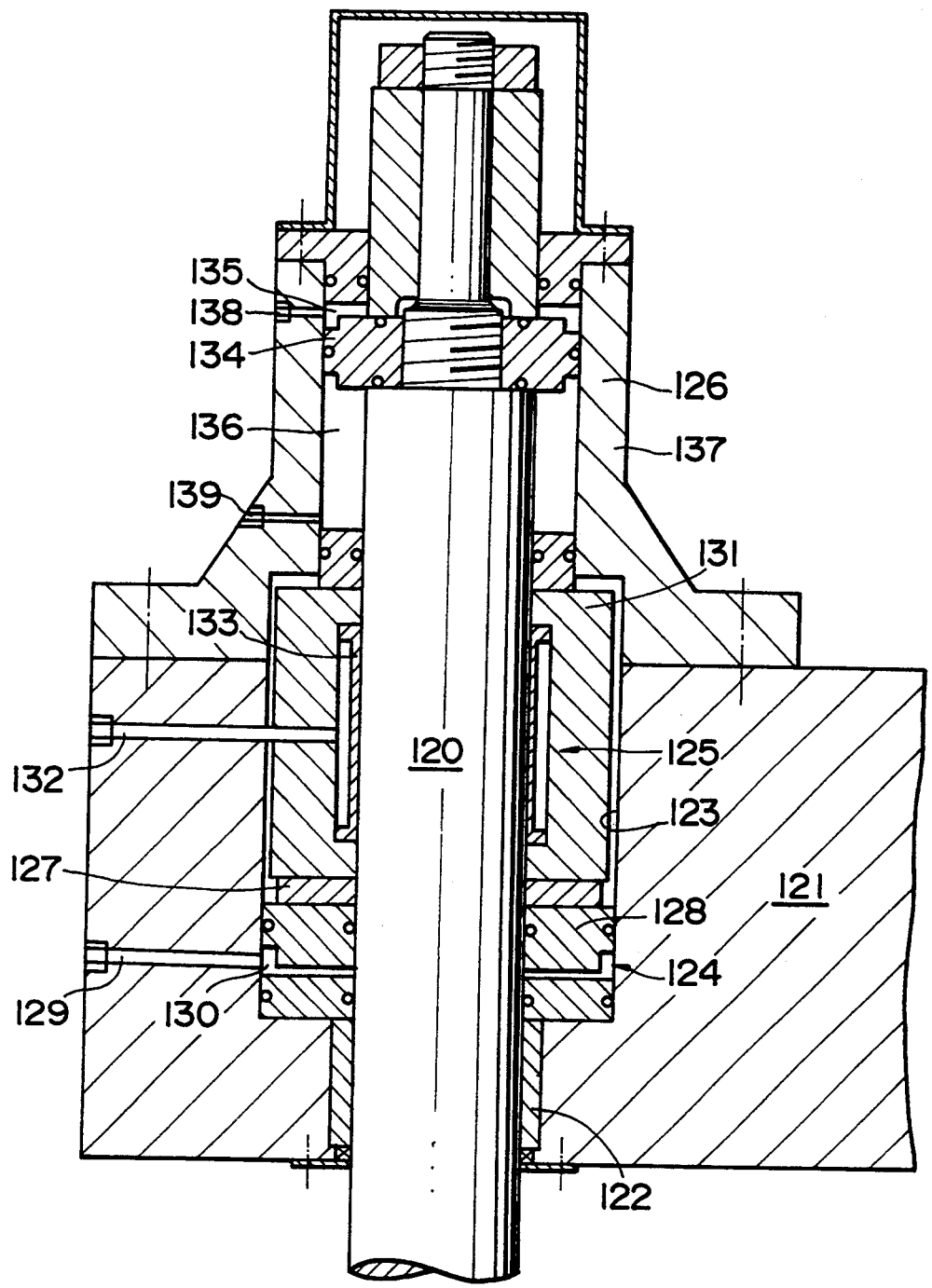
FIG. 5 is a sectional view showing a major portion of a third embodiment.
Figure 6:
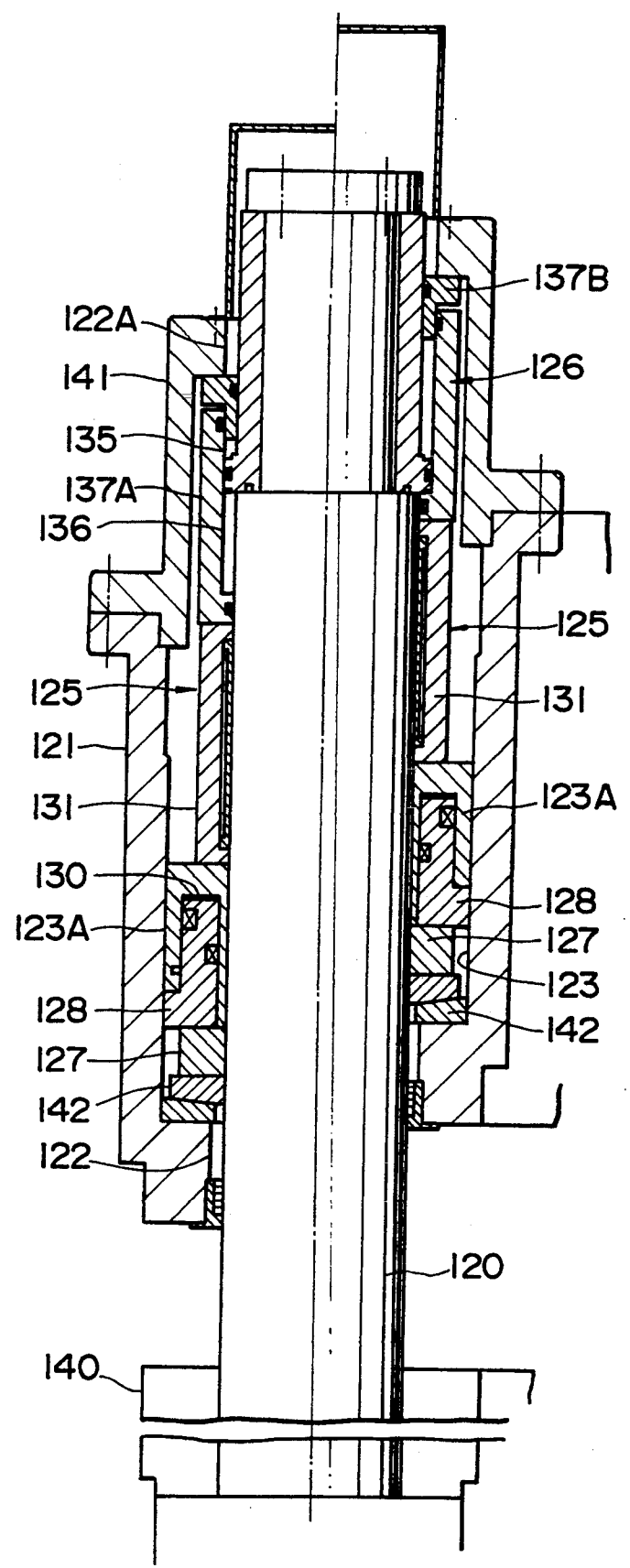
FIG. 6 is a sectional view showing a major portion of a fourth embodiment.
Figure 7:
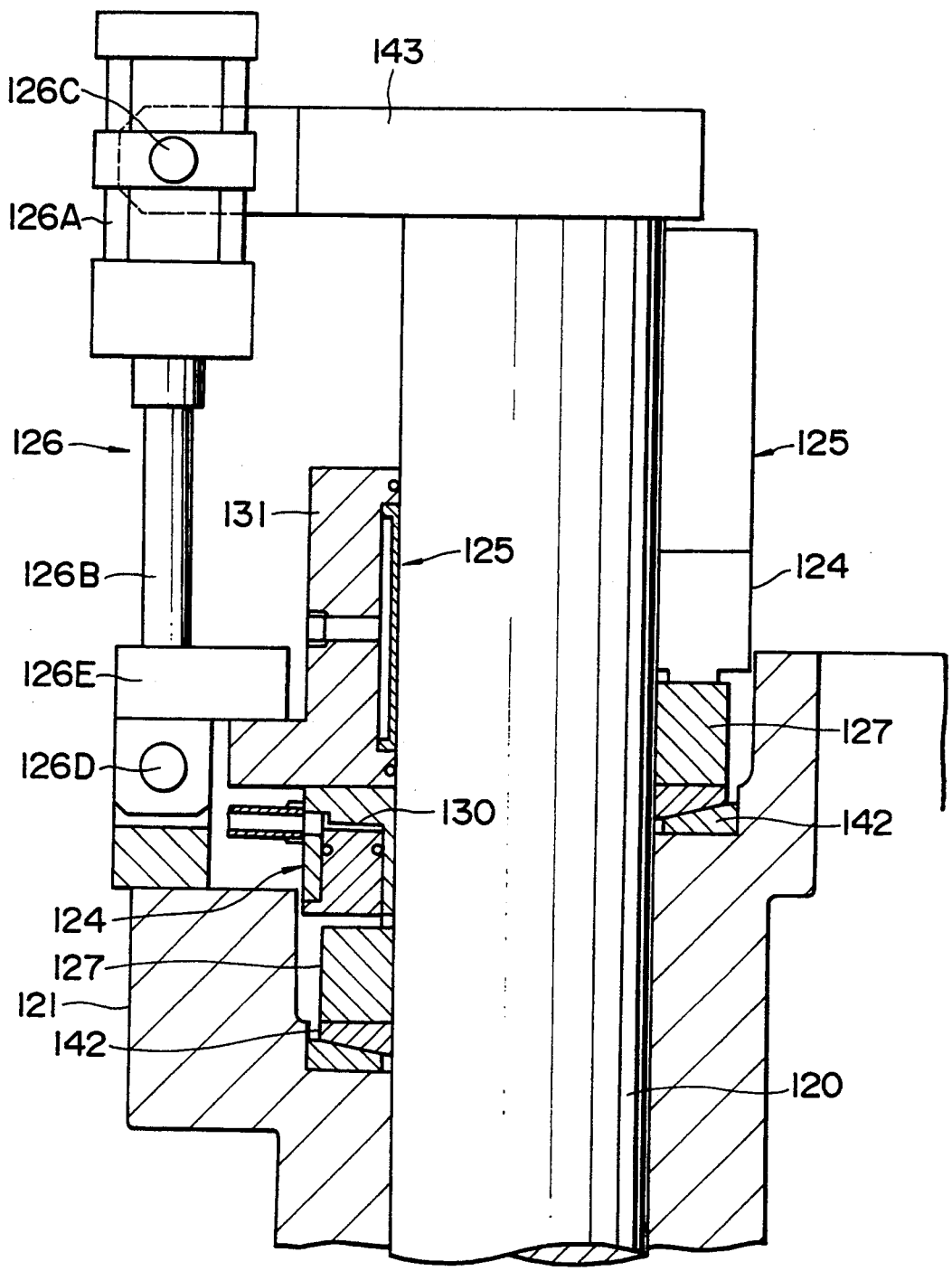
FIG. 7 is a sectional view showing a major portion of a fifth embodiment.
Figure 8:
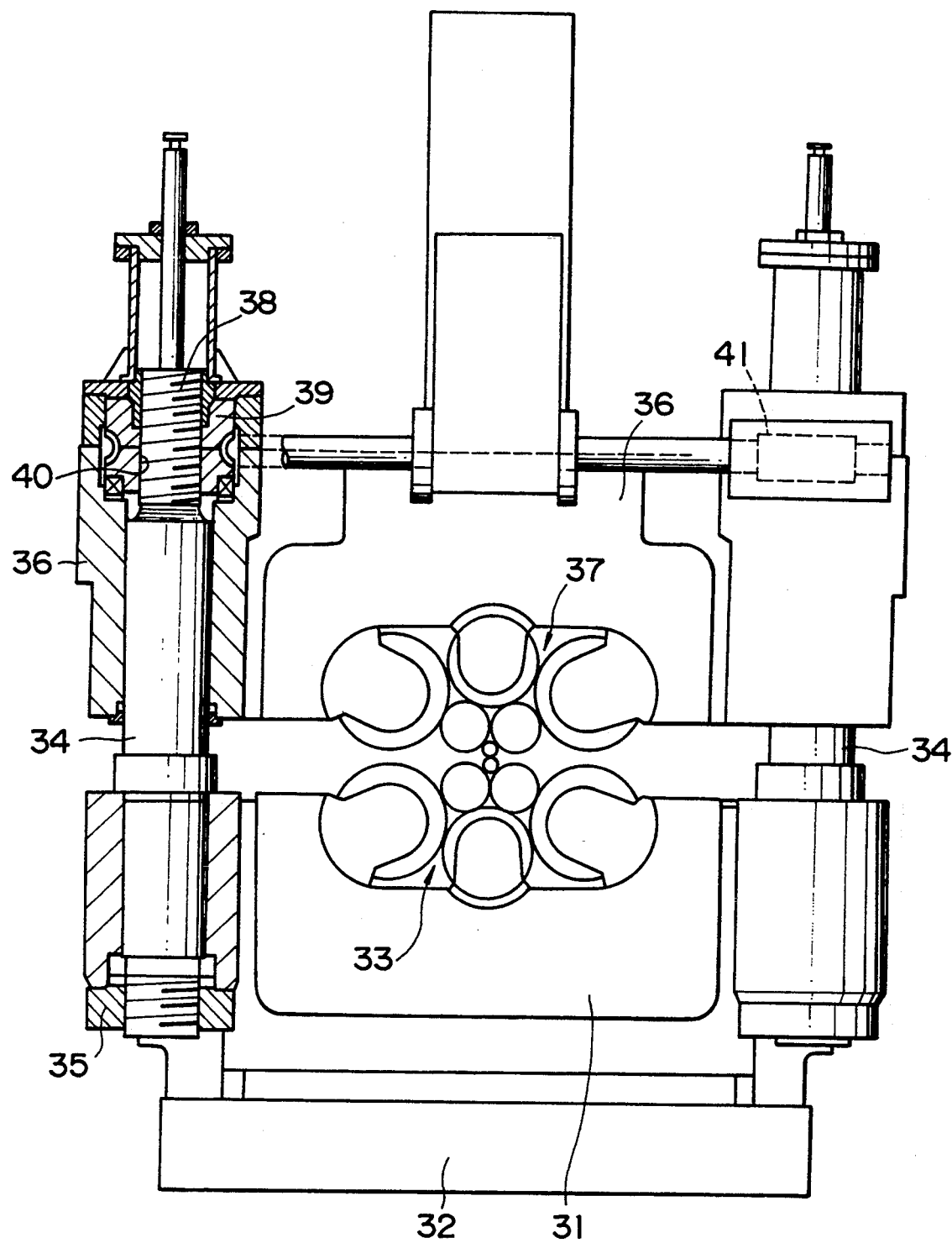
FIG. 8 is a partly broken front view of a conventional example.

FIGS. 5 to 7 show third to fifth embodiments of the present invention.

In the first and second embodiments previously described, the column clamping lock means has to be once released during rolling when a change is made from simultaneous reduction to skew reduction, and after this change the lock means is locked again. On the other hand, the third to fifth embodiments have been improved by requiring no releasing of the lock means when changing the simultaneous reduction to the skew reduction during rolling operation.

That is to say, the third to fifth embodiments have obviated the following disadvantages of once releasing the column clamping lock means when changing to the skew reduction.

(1) It is difficult to hold the position in an instant that the lock is released (an instant when the rolling force holding part changes to the upper fluid chamber from the hydraulic lock). Since this holding of position requires the accuracy of ±1 μm, it is difficult to instantaneously correct a displacement caused by the elastic deformation (compressibility) of the fluid at the instant the lock means is released.

(2) There occurs a time loss in releasing the hydraulic lock (about 1 sec), resulting in a delay in skew reduction operation.

(3) In a rolling mill equipped with an automatic flatness control (AFC), the skew reduction is performed frequently (10 to 100 times more frequently than a rolling mill not equipped with AFC), and therefore the lock means repeats locking and unlocking operation frequently, resulting in deteriorated lock means durability.

(4) A rolling mill provided with a plate thickness control means such as a pair of hydraulic cylinders, has low rigidity between cylinders albeit high rigidity (spring constant) of the cylinder itself; that is, the lateral rigidity (rigidity in the direction of plate width) of the rolling mill, affecting to the shape of materials to be rolled.

Hereinafter principally these improvements will be explained in order. In the third to fifth embodiments described below only one column will be illustrated, but three other columns are of identical constitution.

In the third embodiment shown in FIG. 5, a column 120 erected from the lower housing passes vertically through an upper housing 121, and therefore the upper housing is vertically movable on this column 120 serving as a guide. The upper housing 121, therefore, is provided with a guide bushing 122.

The upper housing 121 is provided with a bottomed concave section 123 formed circular as viewed from above. In this bottomed concave section 123 are installed a plate thickness control means 124 and a lock means 125. The column 120 is disposed through the substantially bottomed concave section 123 and provided with a hydraulic elevating means 126 in the upper part.

The plate thickness control means 124 is mounted through a load cell 127 below the lock means 125, and has a piston 128 which operates hydraulically along the inner peripheral surface as a cylinder surface of the hydraulic elevating means 126. This plate thickness control means 124 has a larger pressure-receiving area and a shorter stroke than the cylinder or piston of the hydraulic elevating means 126 and is operated with the hydraulic fluid being supplied into the fluid chamber 130 from the fluid passage 129 and discharged from the fluid chamber 130.

The lock means 125 has a cylinder 131 fitted in the bottomed concave section 123. In this cylinder 131 is installed a sleeve 133 which is elastically deformed inwardly and outwardly in the radial direction by supplying and discharging the hydraulic fluid from the fluid passage 132, thus clamping and releasing the column 120 as in the case of the first and second embodiments.

The hydraulic elevating means 126 has a piston 134 fixed on the column 120, and a cylinder 137 forming fluid chambers 135 and 136 on and under the piston 134. The cylinder 137 is securely installed by bolts to the upper housing 121, and has fluid passages 138 and 139 communicating with the fluid chambers 135 and 136.

Next, the mode of operation of the third embodiment shown in FIG. 5 will be explained. When a plate is passed through the rolls, the upper housing 121 is held at the end of upward stroke by means of the hydraulic elevating means 126 and clamped by the lock means 125.

After the pass of the plate is completed, the lock means is released and the hydraulic fluid is filled in the fluid chamber 136 and at the same time the hydraulic fluid is discharged from the fluid chamber 135, thus lowering the upper housing 121 as low as the level where the work roll of the upper rolls comes in contact with the material to be rolled.

At this time, the piston 128 in the fluid chamber 130 for reduction has a stroke necessary for escaping the work roll instantaneously with the end of plate pass and a stroke, for example 2 mm, necessary for skew reduction. Filling the hydraulic fluid in the fluid chamber 130 sets a specific rolling load and starts rolling operation with the lock means 125 in a locking state.

During rolling, reduction adjustment and skew reduction can be made without releasing the lock means 125, that is, with the column locked, by feeding the hydraulic fluid into, or discharging from, the fluid chamber 130 of the plate thickness control means 124.

That is to say, the reduction adjustment (simultaneous reduction) can be made by moving the piston 128 by the same amount in the same direction by supplying the hydraulic fluid into, and discharging it from, the fluid chamber 130 of the four plate thickness control means 124.

On the other hand, the skew reduction can be performed by operating two pistons 128 at front and rear in the direction of plate pass of the four plate thickness control means 124 by the same amount in the same direction.

After rolling is finished, first the fluid is discharged out of the fluid chamber 130 to decrease the rolling load to zero (released); thereafter, when rolling is to be performed again, the fluid is filled again in the fluid chamber 130 to apply a specific rolling load and to restart rolling. At this time also, the lock means 125 may be left in the locking state.

When roll replacement is required, the lock means 125 is released and simultaneously with the filling of the hydraulic fluid in the fluid chamber 135, the fluid is discharged out of the fluid chamber 136, thereby elevating the upper housing 121 by the elevating means 126 as high as the position where the rolls can be changed. In this elevated position, the upper housing 121 is locked to allow roll replacement.

The fourth embodiment shown in FIG. 6 is basically common in constitution and function to the third embodiment previously described by referring to FIG. 5. Therefore only differences will be explained hereinafter, using common numerals for common members.

Four columns 120 erected from the lower housing 140 has upper and lower bushings 122 and 122A for guiding the upper housing 121 moving upward and downward. The upper bushing 122A is provided on the cover 141 fixedly installed on the upper housing 121.

In the plate thickness control means 124 the fluid chamber 130 is formed by fitting the cylinder 123A in the bottomed concave section 123 and the piston 128 in the cylinder 123A as in a form of inner and outer inserts.

Below the piston 128 is provided a spherical part 142 in the bottomed concave section 123 through the load cell 127, so that it can follow up a tilting motion during skew reduction.

The elevating means 126 is constituted by providing a cylinder 137A on the cylinder 131 of the lock means 125 and the cover 141 for holding the cylinder cover 137B.

Therefore, in this fourth embodiment also, the reduction adjustment and skew reduction can be done with the lock means 125 in the locking state even during rolling operation, similarly as the third embodiment previously stated.

In FIGS. 6 and 7, the right half indicates the upper housing 121 held at the upper end of stroke, while the left half shows the upper housing 121 at the lower end of stroke.

The fifth embodiment shown in FIG. 7 has a hydraulic cylinder 126A as the elevating means 126 which is pivotally supported by a pivot shaft 126C on a bracket 143 fixed on the upper end of the column 120; the piston rod 126B is also pivotally supported by a pivot shaft 126D to the upper housing 121; and furthermore the cylinder 131 is supported by an arm 126E. The constitution of other members is common to that shown in FIGS. 5 and 6 in the third and fourth embodiments.

Accordingly, the fifth embodiment is basically the same as the third and fourth embodiments excepting the point that the elevating means 126 is off outward from the center of axis of the column 120; common parts, therefore, are expressed by common numerals.

In any of the third to fifth embodiments, the plate thickness control means 124 is located below the lock means 125, and has a larger pressure-receiving area and a shorter stroke than the cylinder or piston of the elevating means 126. These embodiments, therefore, have the following advantages.

(1) There is no necessity of releasing the lock means for clamping the column during rolling operation. That is, it is unnecessary to make nonlinear control, thus insuring simple and high-accuracy positional control of the housing.

(2) There will occur no time loss in releasing the lock means for clamping the column, thus obtaining improved shape controllability.

That is, there is required a short time for shape convergence (stabilization), improving the yield of products.

(3) The locking and unlocking frequency of the lock means for clamping the column decreases, and accordingly the lock means for clamping the column will be usable for a prolonged life.

(4) The fluid chamber which receives a rolling force is provided with a short stroke and a large pressure-receiving area, thereby preventing the lowering of a mill constant likely to be decreased by the elastic deformation of the fluid during rolling. That is, an improved plate thickness accuracy is insured.

In the present invention described above in detail, it is possible to changing settings as desired. For example, electricity may be used as a medium of the lock means to lock and unlock the column by means of an electromagnetic brake. Furthermore the present invention is applicable to multi-stage rolling mills for cold rolling sheets and foils and to hot rolling mills.

It should be noted that the present invention is not limited to the embodiments explained above and many other modifications are possible within the spirit and scope of the invention. It also should be noted that the above-described embodiments are merely examples and must not be limitatively interpreted. Furthermore it should be noted that the scope of the present invention is covered by claims and will not be restricted by texts of this specification. And furthermore all variations and modifications belonging to the uniform scope of the claims are included within the scope of the present invention.

What is claimed is:

1. A rolling mill, comprising:
   lower rolls,
   a lower housing for holding said lower rolls,
   upper rolls,
   an upper housing for holding said upper rolls,
   four columns for connecting said upper housing to said lower housing,
   frictional lock means fitted on an outside of each column and fixed in at least one of said upper and lower housings for locking one of said housings to said columns by clamping said columns, wherein said frictional lock means comprises a cylinder disposed within a cylinder chamber formed in said one of said housings and a clamping sleeve disposed within said cylinder, said clamping sleeve being elastically deformable to clamp and release a column, and said cylinder being vertically movable within said cylinder chamber, and
   a plate thickness control means operated to control a thickness of materials to be rolled by hydraulically adjusting a reduction force of said rolls, wherein said plate thickness control means comprises a piston connected to an end of said cylinder and a fluid chamber formed at a surface of said piston, wherein a plate thickness of materials to be rolled is controlled by adjusting the reduction force of said rolls by filling a fluid in said fluid chamber.

2. A rolling mill as claimed in claim 1, wherein said frictional lock means comprises a sleeve which is elastically deformable in a radial direction of said column, said sleeve being elastically deformed to clamp and release said column.

3. A rolling mill as claimed in claim 1, wherein said frictional lock means is formed in said upper housing, and a load cell is disposed in a lower part of said cylinder chamber.

4. A rolling mill as claimed in claim 1, wherein a load cell is disposed between said piston and said cylinder.

5. A rolling mill as claimed in claim 4, wherein there is provided a spherical surface below said load cell to enable following up skew reduction operation.

6. A rolling mill as claimed in claim 1, wherein said fluid chamber is formed by inserting a piston telescopically in said cylinder having said bottomed concave section.

7. A rolling mill, comprising:
   lower rolls,
   a lower housing for holding said lower rolls,
   upper rolls,
   an upper housing for holding said upper rolls,
   four columns for connecting said upper housing to said lower housing,
   frictional locking means fitted on an outside of each column and fixed in at least one of said upper and lower housings for locking one of said housings to said columns by clamping said columns, and
   plate thickness control means for controlling plate thickness of materials to be rolled by hydraulically adjusting the reduction force of said rolls, wherein said plate thickness control means comprises a hydraulic cylinder mounted on each column, including three stages of contracted section in an upper end section of each column, and said plate thickness control means comprises a fluid chamber formed between a lowermost stage contracted section and said upper housing, and a fixed piston mounted on an outside of a middle stage contracted section, including a threaded section in an uppermost stage contracted section and a fixed nut screwed in said threaded section, said fixed nut fixedly mounting said fixed piston on an upper end surface of each lower most stage contracted section of each column.

8. A rolling mill as claimed in claim 7, wherein a preload cylinder fluid chamber for fastening said fixed nut is provided in said fixed piston.

9. A method for operating a rolling mill having a lower housing for holding lower rolls, an upper housing for holding upper rolls, columns for connecting said upper and lower housing so that said upper housing will be vertically movable in relation to said lower housing, a plate thickness control means for controlling plate thickness of materials to be rolled, by hydraulically adjusting a reduction force of said rolls, a hydraulic elevating means for adjusting a roll gap, and a frictional lock means consisting of an elastically deformable sleeve which clamps and releases said upper housing in relation to said columns, said method, comprising the following steps:

a plate thickness control step for controlling plate thickness of materials to be rolled, by releasing said frictional lock means and operating said plate thickness control means;

a roll gap rapid widening step for rapidly raising said upper housing from said lower housing by releasing said frictional lock means and operating said hydraulic elevating means, and a step of changing simultaneous reduction to skew reduction during said plate thickness control step without releasing said frictional lock means.

10. A method for operating a rolling mill as claimed in claim 9, further comprising: a step, after said roll gap rapid widening step, for operating said frictional lock means with said upper housing elevated, to fix said upper housing to said columns and changing rolls.

11. A method for operating a rolling mill as claimed in claim 9, further comprising: a roll gap presetting step for presetting said roll gap by operating said hydraulic elevating means, prior to said plate thickness control step, to lower said upper housing and then by operating said frictional lock means to clamp said upper housing to said columns.

* * * * *